Sept. 28, 1954  D. M. SMITH  2,689,995
LABORATORY CLAMP
Filed Jan. 28, 1947
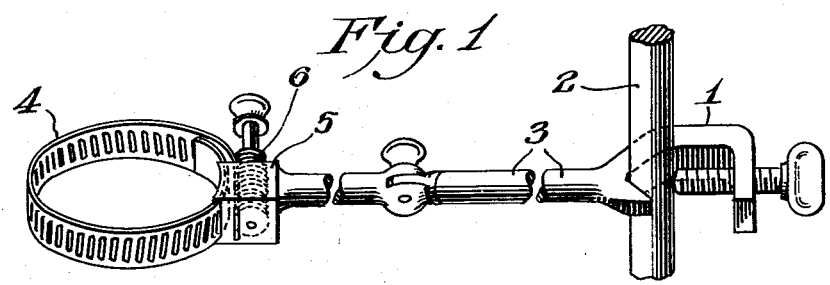
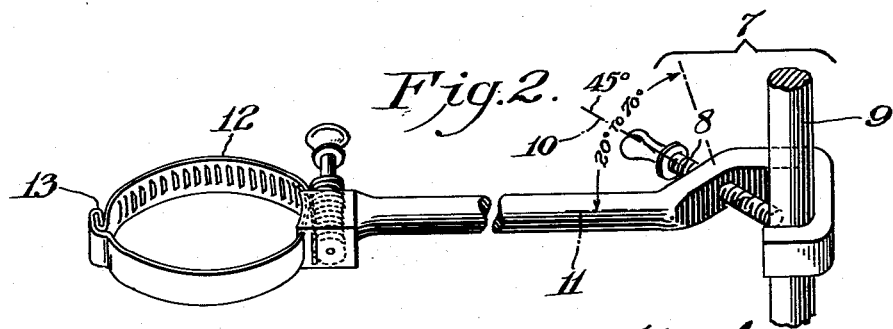
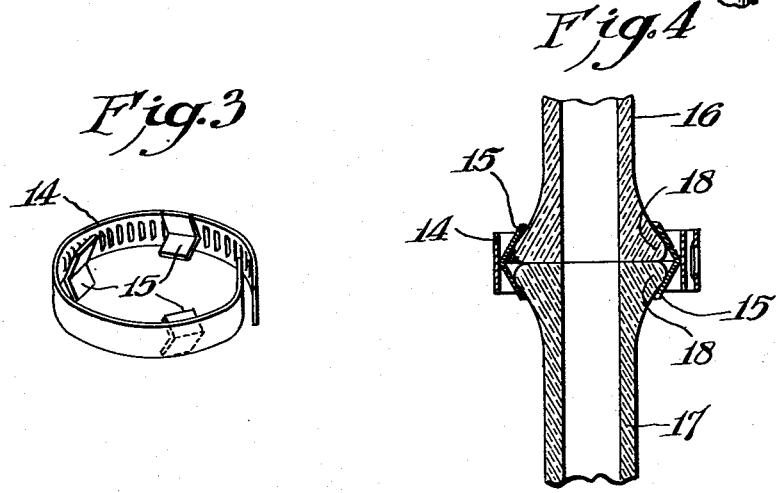
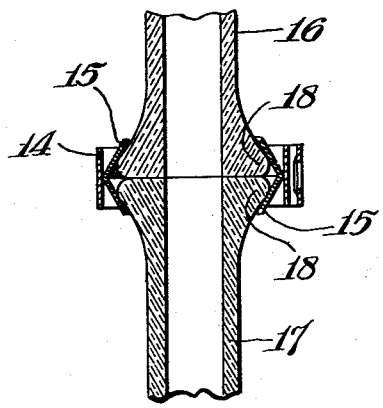
INVENTOR
Donald M. Smith
BY
*Allan R. Plumley*
ATTORNEY Patented Sept. 28, 1954

2,689,995

UNITED STATES PATENT OFFICE 2,689,995

LABORATORY CLAMP

Donald M. Smith, Wilmington, Del.

Application January 28, 1947, Serial No. 724,756

1 Claim. (Cl. 24—243)

This invention relates to an improved adjustable clamp suitable for supporting a variety of kinds of laboratory apparatus.

The laboratory clamps with which this invention is concerned are those comprising an adjustable gripping mechanism designed to grip various kinds of laboratory apparatus and a connecting bar attached thereto. This connecting bar may also be provided, if desired, with an attachment structure located at the opposite end of the connecting bar from the gripping mechanism and suitable for attaching the clamp to a support rod. If no such attachment structure is provided, the clamp must be used in conjunction with a clamp holder, and is then generally known as an extension clamp. The term clamp, as used in the specification and claims, refers to the combination of a gripping mechanism with a connecting bar, whether or not there is also included an attachment structure.

The requirements, for a satisfactory laboratory clamp of this type, are that it must be able to grip firmly the particular article that it is supporting without damaging it, and it must be versatile, easy to construct and easy to manipulate. Laboratory clamps produced heretofore have failed to fully satisfy these requirements, mainly because of the design of that part of the clamp which actually comes into contact with the article to be supported. For the most part, these gripping mechanisms comprise curved fingers, claws, or the like, and when they are used, for instance, to support a slender, cylindrical article, they usually only touch the article at two, three, or four points around its circumference. Even in the unusual case when the degrees of curvature of the article and the claws are the same, the claws contact only about half of the circumference of the article at the point of attachment.

It is an object of this invention to provide an improved adjustable clamp suitable for supporting various kinds of laboratory apparatus. It is a further object to provide an adjustable clamp particularly suited for gripping and supporting slender, cylindrical pieces of laboratory equipment. Other objects of this invention will appear hereinafter.

These objects are accomplished, according to the invention, by providing an adjustable laboratory clamp of the type described, the gripping mechanism of which comprises a flexible metal band which encircles the article to be supported and which may be tightened or loosened at will. Particular embodiments of this novel type of clamp will be described in greater detail below. It will be noted that, in general, the gripping mechanisms to be described are already known in the art and are not, in themselves, the basis of this invention. Rather, the invention relates to the co-action of these gripping mechanisms in combination with other elements in forming the improved laboratory clamps.

Fig. 1 is a diagrammatic view of a laboratory clamp comprising the gripping mechanism, an adjustable connecting bar and an attachment structure.

Fig. 2 is a diagrammatic view of a somewhat similar laboratory clamp in which the gripping mechanism contains a hook and catch arrangement, and a special kind of attachment structure is used.

Fig. 3 is a diagrammatic view of the flexible band of a gripping mechanism which is fitted with V-shaped structures on its inner side.

Fig. 4 is a cross-section view of the flexible band of Fig. 3 being used to hold together the flanged ends of two pieces of tubing.

Referring now to Fig. 1, the clamp depicted therein is provided with an attachment structure 1 by means of which it may be attached to a support rod 2. This attachment structure is connected to the gripping mechanism by connecting bar 3. The gripping mechanism comprises an indented or perforated, flexible, metal band 4, a housing 5, and a threaded worm 6, mounted within said housing. One end of the metal band is fastened to the housing and the other end is engaged by the worm in such a way that turning the worm causes the band to be tightened or loosened depending on the direction of rotation of the worm.

Modifications and adaptations of the clamp depicted in Fig. 1 may be made with great ease. For instance, the attachment structure may be eliminated so as to produce an extension clamp. Or, as a preferred embodiment of this invention, the attachment structure may be of the type disclosed in my copending application S. N. 724,757, filed January 28, 1947, now Patent No. 2,638,301, May 12, 1953.

As shown in Fig. 2, this attachment structure 7 is so constructed that the thumb-screw 8 by means of which the clamp is fastened to the support rod 9, is located, in general, on the same side of the support rod as is the main body of the clamp, the center-line 10 of the thumb-screw and the center-line 11 of the main body of the clamp being at a front angle of about 20° to about 70°. A preferred angle is about 45°.

The connecting bar 3 in Fig. 1 may be modified by incorporating therein a swivel joint so that the gripping mechanism may be held at any desired angle. And the gripping mechanism itself may be modified in innumerable ways. One preferred modification, for instance, is shown in Fig. 2 where the metal band 12 is provided with a hook and catch arrangement 13 whereby the band may be opened for the purpose of inserting the article to be supported, and thereafter may be fastened together again, and the gripping mechanism tightened. Another preferred modification is shown in Figs. 3 and 4, where the indented or perforated metal band 14 is fitted, on its interior circumference, with V-shaped structures 15 of spring-like material, said structures being such that, when the indented or perforated band 14 is drawn tight, these structures tend to force together two pieces of tubing 16 and 17 provided with flanged ends 18, as shown in the drawing. This device is particularly useful in holding together the glass members of a so-called flat-grind, it being possible to hold these members tightly enough so that they will not leak even though no gasket material is included between the flat members. In place of the separate V-shaped structures shown in Fig. 3, there may be substituted one continuous V-shaped structure which proceeds the whole length of the indented or perforated band.

The materials useful in constructing the improved clamps of this invention are generally known in the art. The size of the clamps may vary greatly and will be governed by the size of the equipment that they are to be used to support. The inner face of the metal bands may advantageously be covered with a suitable gripping material, such as rubber or asbestos tape or glass tape, if desired.

The improved clamps of the present invention are particularly useful in that they provide such a large and continuous contact surface between the gripping mechanism and the circumference of the article being supported. Within the width of the metal band, at least half the circumference of the article being supported may be in contact with the gripping mechanism; regardless of moderate changes in the size of the article being gripped. Frequently, as much as 90% or more of the surface within this circumference is directly supported, with the result that the clamp can grip the article with much less chance of its slipping. Further, in order to support a given weight, it is not necessary to exert as great a pressure against any particular point as would be required with clamps known heretofore, since the pressure is more evenly distributed. This often prevents damage to such equipment as, for instance, fragile glassware. It will also be apparent that these clamps are extremely versatile, easy to construct and easy to manipulate. One clamp may be used to support any one of a group of pieces of laboratory apparatus which may vary considerably in size or cross-sectional shape. Clamps of this type are simple to operate, and when constructed, for instance, along the lines shown in Fig. 2, they have the great advantage that they can be manipulated by using only one hand, leaving the operator's other hand completely free.

It will occur to those skilled in the art that many modifications and alterations may be made in the improved laboratory clamps described herein without departing from the spirit and scope of the invention. It is not intended, therefore, that the invention should be restricted in any way other than by the claim appended hereto.

I claim:

An adjustable laboratory clamp comprising a housing; a loop extending from said housing, said loop comprising a perforated flexible band and being adapted to completely encircle and support laboratory apparatus; a manually rotatable, threaded worm mounted within said housing and tangentially to said loop, the threads of said worm engaging the perforations in said flexible band in such a way that the loop will either be tightened or loosened, depending upon the direction of rotation of the worm; a connecting bar attached to said housing, the center line of which extends away from said housing in the plane of said loop and at approximately right angles to the center line of said worm; and said loop also being provided on the inner side of its circumference with at least one spring-metal, V-shaped unit, each of such units being mounted with the base of the V attached to the loop in such a way that if the loop is placed over a joint formed by the flanged ends of two tubes and the loop is tightened, the arms of the V-shaped units will exert pressure on the two flanges tending to force them together and forming a strong joint.

References Cited in the file of this patent

UNITED STATES PATENTS

| Number | Name | Date |
|---|---|---|
| 593,736 | Colyer | Nov. 16, 1897 |
| 746,188 | Sonsthagen | Dec. 8, 1903 |
| 1,093,868 | Leighty | Apr. 21, 1914 |
| 1,104,352 | Erlandsson | July 21, 1914 |
| 1,363,231 | Danly | Dec. 28, 1920 |
| 1,397,508 | Gillet | Nov. 22, 1921 |
| 1,419,897 | Palmer | June 13, 1922 |
| 1,486,158 | Price | Mar. 11, 1924 |
| 1,498,539 | Callahan | June 24, 1924 |
| 1,512,875 | Byam | Oct. 21, 1924 |
| 1,754,929 | Atticks et al. | Apr. 15, 1930 |
| 1,784,516 | Fairbanks | Dec. 9, 1930 |
| 1,882,305 | Stupar | Oct. 11, 1932 |
| 1,913,562 | Olley | June 13, 1933 |
| 1,917,192 | Hueber | July 4, 1933 |
| 2,269,790 | Sherrill | Jan. 13, 1942 |
| 2,301,243 | Binkley | Nov. 10, 1942 |
| 2,327,326 | Churchill | Aug. 17, 1943 |
| 2,375,507 | Van Tuyl et al. | May 8, 1945 |
| 2,386,629 | North et al. | Oct. 9, 1945 |
| 2,391,403 | Friderici | Dec. 25, 1945 |
| 2,452,806 | Tetzlaff | Nov. 2, 1948 |
| 2,460,981 | Francisco Jr., et al. | Feb. 8, 1949 |

FOREIGN PATENTS

| Number | Country | Date |
|---|---|---|
| 3,336 | Great Britain | Feb. 20, 1900 |
| 340,871 | Great Britain | Jan. 8, 1931 |
| 523,313 | Great Britain | July 11, 1940 |